UNITED STATES PATENT OFFICE.

THEODORE S. PIERCE, OF ST. JOSEPH, MICHIGAN, ASSIGNOR TO THE MICHIGAN SAND BRICK COMPANY, OF CHICAGO, ILLINOIS, AND GRAND RAPIDS, MICHIGAN.

BUILDING-BLOCK AND PROCESS OF MAKING SAME.

SPECIFICATION forming part of Letters Patent No. 509,822, dated November 28, 1893.

Application filed April 3, 1893. Serial No. 468,933. (No specimens.)

*To all whom it may concern:*

Be it known that I, THEODORE S. PIERCE, a citizen of the United States, residing at St. Joseph, in the county of Berrien and State of Michigan, have invented certain new and useful Improvements in Building-Blocks and Processes of Making the Same; and I do hereby declare the following to be a full, clear, and exact description of the invention, such as will enable others skilled in the art to which it appertains to make and use the same.

My invention relates to improvements in building block and process of making the same.

My improved building block or brick is composed of hydraulic cement, sand, sugar or equivalent saccharine matter, potassium nitrate, silicate of soda, alum, sulphuric acid, and water, which are mixed or combined in the manner and proportions that will be hereinafter fully pointed out and claimed.

In preparing my improved composition, I first thoroughly mix one part of hydraulic cement and four parts of sand. In a suitable vat or vessel I dissolve, in warm water, three (3) pounds of sugar, or equivalent saccharine matter, and three and one half (3½) pounds of potassium nitrate. When this solution has become cool I add thereto eight (8) pounds of silicate of soda and forty-five (45) gallons of water, the entire solution being thoroughly stirred or otherwise agitated to mix all of the ingredients. In another vat or similar vessel, I dissolve, in warm water, three and one half (3½) pounds of alum and to this solution is added two and one half (2½) pounds of sulphuric acid and forty-five (45) gallons of water. After this second solution has been stirred or otherwise suitably agitated to thoroughly mix the ingredients thereof, twelve (12) quarts of said solution are added to and thoroughly mixed with the first solution. The cement and sand, which have previously been thoroughly mixed while dry, are reduced to a plastic condition by adding thereto a suitable quantity of the solution formed by mixing with the first solution a portion, preferably twelve (12) quarts, of the second solution. When the material has been reduced to a plastic state it is placed in suitable molds and pressed into a solid and compact block or brick of the desired size and form.

A building block or brick constructed in accordance with the hereinbefore described process has been found to be strong and durable and better adapted to withstand severe heat or cold than the material commonly used for the same purpose.

The proportions herein given have been found, by practical tests, to be substantially correct for obtaining the best results; but I do not wish to be understood as intending to limit myself to the exact proportions named, as the ingredients may be mixed in different proportions without materially affecting the product.

What I claim as new, and desire to secure by Letters Patent, is—

1. The herein described composition for building blocks or brick, consisting of hydraulic cement, sand, sugar or equivalent saccharine matter, potassium nitrate, silicate of soda, alum, sulphuric acid, and water, combined substantially in the manner and proportions specified.

2. The herein described process of making artificial building block or brick, which consists, first, in thoroughly mixing sand and hydraulic cement in substantially the proportions specified, then reducing such mixture to a plastic condition by a solution composed of water, sugar, or equivalent saccharine matter, potassium nitrate, silicate of soda, alum, and sulphuric acid, combined substantially in the manner and proportions specified, and finally in molding the plastic mass into the desired form, substantially as described.

In testimony whereof I affix my signature in presence of two witnesses.

THEODORE S. PIERCE.

Witnesses:
CHARLES B. FIELD,
ELVIN SWARTHOUT.